United States Patent [19]

Katz et al.

[11] Patent Number: 4,548,874
[45] Date of Patent: Oct. 22, 1985

[54] SHORT PROTECTION DEVICE FOR STACK OF ELECTROLYTIC CELLS

[75] Inventors: Murray Katz, Newington; Craig R. Schroll, West Hartford, both of Conn.

[73] Assignee: The United States of America as represented by the United States Department of Energy, Washington, D.C.

[21] Appl. No.: 676,340

[22] Filed: Nov. 29, 1984

[51] Int. Cl.[4] .............................................. H01M 8/24
[52] U.S. Cl. ......................................... 429/18; 429/35
[58] Field of Search .................... 429/18, 35; 204/196, 204/197

[56] References Cited

U.S. PATENT DOCUMENTS

| | | | |
|---|---|---|---|
| 3,798,142 | 3/1974 | Evans | 204/196 |
| 4,377,445 | 3/1983 | Grimes | 429/18 |
| 4,414,294 | 11/1983 | Guthrie | 429/35 |
| 4,465,742 | 8/1984 | Nagashima et al. | 428/621 |
| 4,467,018 | 8/1984 | Schroll | 429/35 |

OTHER PUBLICATIONS

Development of Molten Carbonate Fuel Cell Power Plant Technology, Quarterly Technical Progress Report No. 16, Oct. 1983.

Primary Examiner—Donald L. Walton
Attorney, Agent, or Firm—Hugh W. Glenn; Robert J. Fisher; Judson R. Hightower

[57] ABSTRACT

Electrical short protection is provided in an electrolytic cell stack by the combination of a thin, nonporous ceramic shield and a noble metal foil disposed on opposite sides of the sealing medium in a gas manifold gasket. The thin ceramic shield, such as alumina, is placed between the porous gasket and the cell stack face at the margins of the negative end plate to the most negative cells to impede ion current flow. The noble metal foil, for instance gold, is electrically coupled to the negative potential of the stack to collect positive ions at a harmless location away from the stack face. Consequently, corrosion products from the stack structure deposit on the foil rather than on the stack face to eliminate electrical shorting of cells at the negative end of the stack.

10 Claims, 1 Drawing Figure

SHORT PROTECTION DEVICE FOR STACK OF ELECTROLYTIC CELLS

CONTRACTUAL ORIGIN OF THE INVENTION

The U.S. Government has rights in this invention pursuant to Contract No. DE-AC01-79ET15440 between the U.S. Department of Energy and United Technologies.

BACKGROUND OF THE INVENTION

The present invention relates to a device for preventing the electrical shorting of a stack of electrolytic cells during an extended period of operation. The device has application to fuel cell and other electrolytic cell stacks operating in low or high temperature corrosive environments. It is of particular importance for use in a stack of fuel cells operating with molten metal carbonate electrolyte for the production of electric power. Also, the device may have application in similar technology involving stacks of electrolytic cells for electrolysis to decompose chemical compounds. A representative fuel cell stack is illustrated in U.S. Pat. No. 4,345,009, Aug. 17, 1982.

The individual stacks of cells must be provided with reactant gases for their operation. Fuel gases such as hydrogen or producer gas from the gasification of solid carbonaceous material can be employed at the negative electrodes in a fuel cell stack. In addition, an oxidant gas such as oxygen or air is provided for reaction at the positive electrode. In cells employing metal carbonate electrolyte, carbon dioxide generated in the negative electrode is provided to the positive electrode for replenishing carbonate in the electrolyte.

The manifolds carrying these reactant gases must be connected to the cell stacks in an electrically insulated and leak type manner. The high temperature and corrosive environment in molten carbonate and other types of cell stacks have resulted in only a select few types of sealing designs to connect the manifolds to the stacks. One such design is described in U.S. Pat. No. 4,414,294 issued to Guthrie, Nov. 8, 1983. The disclosure of this patent is specifically incorporated by reference herein for the purpose of describing a sealing arrangement between the gas supply manifold and fuel cell stack.

In addition to the difficult problems of sealing the manifold to the stack, long term operation has resulted in the electrical shorting of groups of cells within the series arranged stack. These electrode shorts were believed to be the results of corrosion products from the fuel cell stack structure. Previous attempts to correct this problem have involved the selection of less corrosive construction material or coatings on materials exposed to the high temperatures and corrosive electrolyte. Such an approach is not totally effective and is expected to result in substantially increased cost of cell stack construction.

SUMMARY OF THE INVENTION

Therefore it is an object of the present invention to provide an uncomplicated and relatively inexpensive device for protecting stacks of electrolytic cells from electrical shorting.

It is a further object of the present invention to provide an electrical short protection device that requires a minimal amount of expensive, corrosion resistant material.

It is a further object of the present invention to provide a short protection device in cooperation with a gas seal between the supply gas manifold and the open face of an electrolytic cell stack.

In accordance with the present invention, an electrical short protection device in combination with a gas seal is provided for use at the open face of an electrolytic cell stack. A protection device includes a generally non-porous, electrically insulative shield at the marginal portions of at least two stack cells in contact with the porous sealing medium of the gas seal. An electrically conductive foil of corrosion resistant material is electrically coupled to the negative potential of the cell stack. The foil is disposed at the porous sealing medium surface opposite to but in general alignment with the electrically insulative shield. Metal ions electrolytically dissolved from the cell stack structure at more positive electrical locations preferentially migrate to the negatively biased foil instead of the stack face to minimize plating out of metals that may electrically short cells of the stack.

In more specific aspects of the invention, the electrically insulative shield is a ceramic material that is substantially impervious or non-porous to the molten carbonate electrolyte used in the stack cells and is preferably a thin strip of non-porous alumina.

In other aspects of the invention, the corrosion resistant, electrically conductive foil is of a noble metal or noble metal alloy containing such as gold to substantially resist corrosion by molten metal carbonate electrolyte at elevated temperatures. Minimal amounts of the gold-containing foil are employed. For instance a foil of about 1–2 cm wide, 50–100 microns thick and 2–3 cm long can be sufficient.

In yet other aspects of the invention the gas seal includes a first layer of porous sealing medium in sealing engagement with edge surfaces of the gas supply manifold and a second layer of porous sealing medium in sealing engagement with the marginal face portions of the cell stack. The two layers of porous sealing medium are separated by an electrically insulative frame portion of non-porous ceramic material in sealing engagement between the layers of sealing media. In this particular arrangement, the electrically conductive, corrosion resistant foil is disposed between the second layer of porous sealing medium and the electrically insulative frame portion.

In other aspects of the invention, the porous sealing medium is a porous ceramic mat of zirconia, alumina or lithium aluminate and the electrically insulative frame portion is a generally non-porous ceramic including zirconia, alumina or lithium aluminate.

In one other specific aspect of the invention the non-porous shield is an elongated strip extending lengthwise between the porous sealing medium and the marginal portions of the cell stack from the negative end plate to the second to fifth cells of most negative electrical potential.

BRIEF DESCRIPTION OF THE DRAWINGS

The present invention is illustrated in the accompanying drawing which is a schematic view partly in section of an electrolytic cell stack.

DETAILED DESCRIPTION OF THE PREFERRED EMBODIMENT

Figure 1:
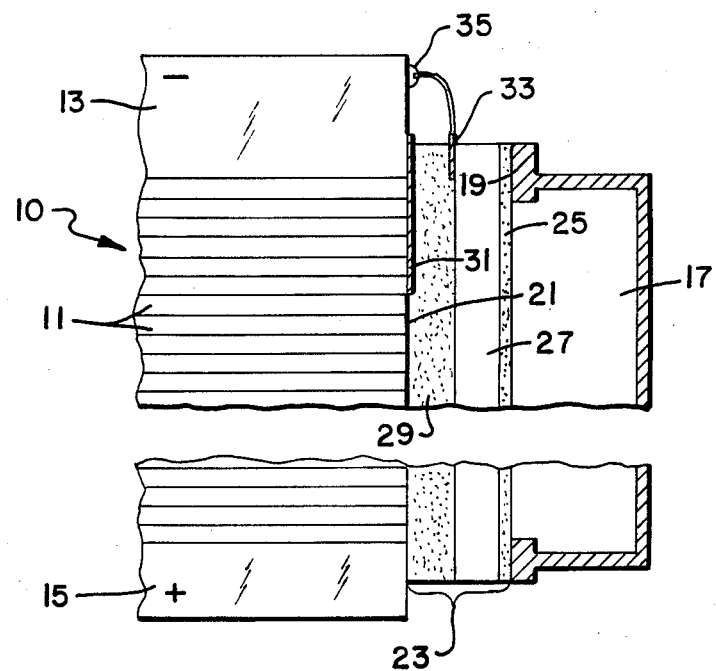

In FIG. 1 an electrolytic cell stack 10 is schematically illustrated with a plurality of fuel cells 11 with negative 13 and positive 15 end plates for stack support. A gas supply manifold or plenum 17 with edge surfaces 19 in sealing engagement with a face 21 of the cell stack.

A gas seal 23, sealingly couples the edge surfaces 19 of the gas supply manifold to the marginal surfaces of the stack face 21. Gas seal 23 is an enclosed frame designed to seal at the periphery of the gas manifold on edge surfaces 19. For clarity in illustration, the thicknesses of the gas seal components are exagerated in respect to the manifold and stack. A typical sealing frame is illustrated in U.S. Pat. No. 4,414,294 issued Nov. 8, 1983 which is incorporated herein by reference for this purpose. As illustrated, gas seal 23 includes a first gasket or porous sealing medium 25, a solid non-porous ceramic frame 27, and a second porous sealing medium or gasket 29 all in layered arrangement compressed between the marginal surfaces of the stack face 21 and the edge surfaces 19 of the manifold 17.

In the typical electrolytic cell stack operation, the electrolyte from the fuel or other electrolytic cells will be sorbed at least into the second porous sealing media 29 disposed against the cell stack face. Positive ions will migrate through the electrolyte within the porous sealing media 29 from the positive to the negative end portions of the stack. This ionic flow causes a shunt current which not only is undesirable from the standpoint of stack efficiency but also because positive ions of corrosion products can be deposited to electrically short cells at the negative end portion of the stack.

It has been found that the ionic shunt current exerts a net effect in ionic concentrations only in the few cells at the extreme ends of the cell stack. Generally, only one or two cells will be so affected and in most instances, no more than five cells are involved. Accordingly, the risk of electrical shorting from the deposition of positive corrosion product ions appears only in the cells proximate to the negative potential of the stack.

The electrical short protection device of this invention is presented for installation at the negative stack end. The device comprises a thin strip or edge shield 31 of generally non-porous electrically insulative material that is fitted between the cell stack margin and the porous sealing medium or gasket 29. A second component of the device is an electrically conductive foil 33 disposed across the thickness of gasket 29 from the shield 31.

Shield 31 has a width at least equal to that of porous sealing medium 29 and a length sufficient to extend along at least the margin from the negative end plate to the second cell or possibly as many as five electrolytic cells. The shield is for instance, 1-2 cm wide and of minimal thickness, 500 microns or less to avoid interference with the sealing effectiveness of the porous sealing medium 29. In a stack employing molten metal carbonates as electrolytes and operating at elevated temperatures of 600°-700° C., shield 31 is provided of a ceramic material for instance of alumina, zirconia, or lithium aluminate. From the standpoint of strength and practicability alumina has been found to be the preferable selection for shield 31. Shield 31 is generally non-porous to be effectively impermeable to the liquid or molten electrolyte of the electrolytic cells. Consequently, the shield provides an increased pathlength and resistance to shunt current flow biased towards the fuel cells at the negative end of the stack. This increased pathlength and resistance is of particular importance when considered with the second important component of the short protection device combination.

The short protection device also includes an electrically conductive foil 33 of very non-corrosive or inert material in respect to the electrolytic stack environment. In stacks requiring the use of high temperature molten metal carbonates as electrolyte, only the noble metals and their alloys have been found suitable for foil 33. Foils containing gold or alloys containing major weight portions of gold are contemplated for use in the construction of foil 33. For example, gold or gold with platinum, rhodium, or iridium additives are contemplated for use.

Electrically conductive foil 33 is electrically coupled at 35 to the negative potential of the cell stack. The foil is of similar shape and length to that of edge shield 31 and as illustrated is placed between the outer surface of the second porous sealing medium 29 and the ceramic frame member 27 of the gas seal 23. As in the case of the edge shield 31, foil 33 is of minimal thickness e.g. 50–100 microns in order to minimize its effect on the sealing arrangement and to minimize cost. The foil typically will be 1 to 2 cm wide and about 2 to 3 cm long which typically corresponds in width, but is shorter than the length of the edge shield 31.

As a result of the negative potential of foil 33, corrosion product ions migrating towards the negative end of the cell stack will deposit on foil 33 as opposed to the margins of the negative cells in the fuel cell stack which are blocked by the edge shield.

The inventors have found that the electrical short protection device including both the edge shield and the electrically conductive foil need only be placed at the marginal side margins of the negative end of the fuel cell stack face. Accordingly, for each sealing arrangement between the manifold and cell stack face, two short protection devices are required one at either side of the negative stack end. In a typical fuel cell stack, four manifolds or plenums are required, two for the entering and two for the exiting gas flows. In such an arrangement, eight short protection devices are required.

In the operation of a 20 cell molten carbonate fuel cell stack with applicants' short protection device installed, no shorting of the upper fuel cells occured after 2000 hours of operation. In previous runs without the inventors' short protecting device only 200 to 300 hours could be run before electrical shorting across cells occurred. This prototype fuel cell stack included stainless steel hardware, nickel oxide cathodes, nickel anodes, and lithium aluminate porous matrices for containment of lithium and potassium carbonate electrolyte. Upon inspection of the cell, the inventors found stainless steel corrosion at the positive end of the stack and iron plated onto an electrically conductive foil provided with a major weight portion of gold.

Therefore, it will be clear that the present invention provides an improved and inexpensive short protection device for use with a stack of electrolytic cells. Both fuel cell and other electrolytic cells installations are expected to benefit from use of the present short protection device. Electrical shorts can be prevented that would otherwise occur at the negative end of the cell stack typically between the first through the fifth cells. Relatively small amounts and sizes of inert corrosive resistant materials such as the noble metals are employed so that the overall expense is not excessive.

It will be clear that various changes can be made in accordance with the invention as claimed. For instance, the drawing and description illustrate the electrolytic cell stack aligned with the negative end at the top and the positive end at the bottom. Although this is a preferred alignment to impede positive ion migration towards the negative end of the stack, other arrangements with the negative end downward or to the side can also be employed.

Although the present invention has been described in terms of the specific embodiment, it will be clear that various changes in the materials form and details can be made by one skilled in the art within the scope of the appended claims.

The embodiments of this invention in which an exclusive property or privilege is claimed are defined as follows:

1. An electrical short protection device in combination with a gas seal between a gas supply manifold and a face of an electrolytic cell stack, said stack having opposite ends of negative and positive electrical potential, wherein said gas seal includes a porous sealing medium between marginal portions of the stack face and the manifold, said electrical short protection device comprising:
   a generally non-porous electrically insulative shield between the marginal portions of at least two cells in the negative end of the stack and said porous sealing medium; and
   an electrically conductive foil of corrosion resistant material electrically coupled to the negative potential of the cell stack, said foil disposed across the thickness of the porous sealing medium from the electrically insulative shield in general alignment therewith, wherein electrolytically dissolved metal ions preferentially migrate to the foil instead of the face of the fuel cell stack.

2. The device of claim 1 wherein the fuel cells in said stack include a molten electrolyte of metal carbonate, which molten carbonate permeates the porous sealing medium between said shield and said foil.

3. The device of claim 1 wherein said electrically insulative shield is of a ceramic material that is substantially impervious to molten electrolyte in said stack of cells.

4. The device of claim 3 wherein said ceramic material includes non-porous alumina in a thin strip.

5. The device of claim 1 wherein said corrosion resistant foil is of a noble metal or an alloy of noble metals to substantially resist corrosion by molten metal carbonate electrolyte.

6. The device of claim 4 wherein said electrically conductive foil is about 1-2 cm wide, about 2-3 cm long and about 50-100 microns thick.

7. The device of claim 1 wherein said electrically conductive foil includes a major weight fraction of gold.

8. The device of claim 1 wherein said gas seal comprises a first layer of porous sealing medium in sealing engagement with edge surfaces of the gas supply manifold, a second layer of porous sealing medium in sealing engagement with the marginal portions of the cell stack face and an electrically insulative frame portion of non-porous ceramic material between and in sealing engagement with said first and second layers of porous sealing medium and wherein said electrically conductive foil is disposed between said second layer of porous sealing medium and said electrically insulative frame portion.

9. The device of claim 8 wherein said porous sealing medium is a porous mat of ceramic including zirconia, alumina or lithium aluminate and said electrically insulative frame portion is a generally non-porous ceramic including zirconia, alumina or lithium aluminate.

10. The device of claim 1 wherein said shield and foil are elongated strips extending lengthwise along opposite surfaces of said porous sealing medium with the edge shield at marginal portions of the cell stack face from the negative end plate to the second to fifth cells of most negative electrical potential in the stack.

* * * * *